(12) United States Patent
Mancosu et al.

(10) Patent No.: US 7,051,778 B2
(45) Date of Patent: May 30, 2006

(54) DEVICE AND METHOD FOR GENERATING ENERGY IN A ROLLING WHEEL

(75) Inventors: Federico Mancosu, Milan (IT);
Giuseppe Matrascia, Seregno (IT);
Anna Paola Fioravanti, Monza (IT)

(73) Assignee: Pirelli Pneumatici S.p.A., Milano (IT)

( * ) Notice: Subject to any disclaimer, the term of this patent is extended or adjusted under 35 U.S.C. 154(b) by 17 days.

(21) Appl. No.: 10/451,394

(22) PCT Filed: Dec. 17, 2001

(86) PCT No.: PCT/EP01/15022

§ 371 (c)(1),
(2), (4) Date: Jan. 13, 2004

(87) PCT Pub. No.: WO02/051655

PCT Pub. Date: Jul. 4, 2002

(65) Prior Publication Data

US 2004/0108723 A1   Jun. 10, 2004

Related U.S. Application Data

(60) Provisional application No. 60/266,868, filed on Feb. 7, 2001.

(30) Foreign Application Priority Data

Dec. 22, 2000 (EP) .................................. 00830850

(51) Int. Cl.
*B60C 29/00* (2006.01)
(52) U.S. Cl. ........................ 152/426; 152/419
(58) Field of Classification Search ................ 152/415, 152/418, 419, 423, 424, 425, 426; 290/1 R; 137/223, 224, 225, 226
See application file for complete search history.

(56) References Cited

U.S. PATENT DOCUMENTS

| | | | | | |
|---|---|---|---|---|---|
| 535,505 | A | * | 3/1895 | Moore | 152/426 |
| 1,348,111 | A | * | 7/1920 | Hayford | 152/426 |
| 1,655,986 | A | * | 1/1928 | Crandall | 152/425 |
| 1,793,429 | A | * | 2/1931 | Mascarenhas | 152/425 |
| 2,084,381 | A | * | 6/1937 | Campbell | 152/426 |
| 2,119,735 | A | * | 6/1938 | Campbell | 152/425 |
| 2,690,757 | A | * | 10/1954 | Orchowski | 137/226 |
| 5,325,902 | A | * | 7/1994 | Loewe et al. | 152/419 |
| 5,409,049 | A | | 4/1995 | Renier | |
| 5,667,606 | A | | 9/1997 | Renier | |
| 5,975,174 | A | | 11/1999 | Loewe | |
| 6,470,933 | B1 | * | 10/2002 | Volpi | 152/152.1 |

* cited by examiner

FOREIGN PATENT DOCUMENTS

JP        60-148705        *   8/1985

*Primary Examiner*—Russell D. Stormer
(74) *Attorney, Agent, or Firm*—Finnegan, Henderson, Farabow, Garrett & Dunner, L.L.P.

(57) ABSTRACT

A device for generating energy in a rolling wheel includes one part that can move with respect to a wheel rim. The one part is engaged with elastic portion that keeps it in contact with a predetermined bead portion of a tire. The one part undergoes reciprocating outward and return motion against action of the elastic portion, as a result of forces induced in the one part by contact pressure that varies cyclically during each tire revolution and is exerted on the one part by the predetermined bead portion. Also disclosed is a method for generating energy in a rolling wheel that includes subjecting one part of the wheel to elastic force that keeps the one part in contact with the predetermined bead portion, and subjecting the one part to the cyclically-varying contact pressure.

18 Claims, 8 Drawing Sheets

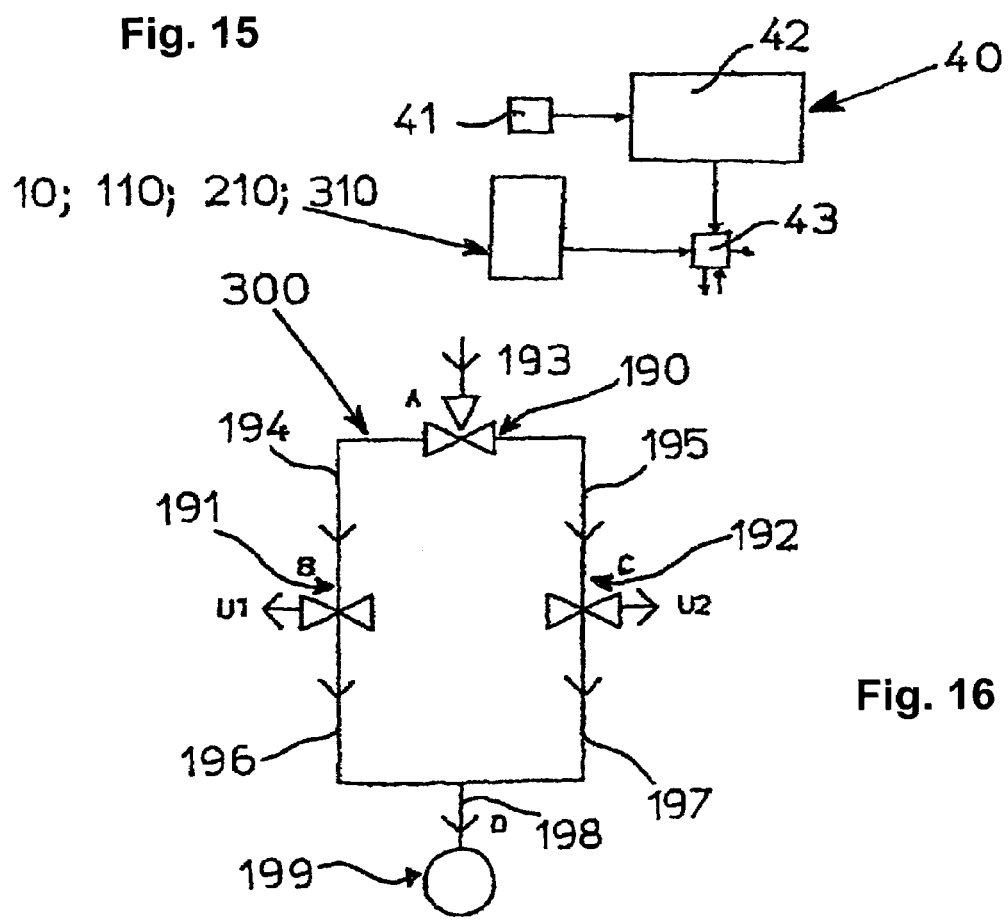

DEVICE AND METHOD FOR GENERATING ENERGY IN A ROLLING WHEEL

CROSS-REFERENCE TO RELATED APPLICATIONS

This application is a national-phase entry under 35 U.S.C. § 371 from International Application No. PCT/EP01/15022, filed Dec. 17, 2001, in the European Patent Office, the contents of which are relied upon and incorporated herein by reference; additionally, Applicants claim the right of priority under 35 U.S.C. § 119(a)–(d) based on patent application No. 00830850.4, filed Dec. 22, 2000, in the European Patent Office; further, Applicants claim the benefit under 35 U.S.C. § 119(e) based on provisional application No. 60/266,868, filed Feb. 7, 2001, in the U.S. Patent and Trademark Office.

BACKGROUND OF THE INVENTION

1. Field of the Invention

The present invention relates to a method and a device for generating energy which can be used, for example, for carrying out operations with pressurized air during the rolling of a tyre fitted on a rim, and, in particular, for supplying compressed air which can be used to obtain the desired pressure level within the tyre during the running of a motor vehicle.

2. Description of the Related Art

During the operation of a motor vehicle, a knowledge of the value of the tyre pressure is an extremely important factor for the continuous control of the tyres and for ensuring safe travel of the motor vehicle. This is because keeping the pressure at the specified value enables the best possible performance to be obtained from the tyre in terms of wear, rolling resistance, roadholding, braking etc., and affects the safety of the driving of the motor vehicle.

There are known devices designed to generate pressurized air to be sent into a tyre of a motor vehicle during running.

U.S. Pat. No. 5,409,049 describes an apparatus for pressurizing a tyre fitted on a wheel. The apparatus includes a displacement-type air pump consisting of a free and oscillating piston body provided with a reciprocating linear motion by the action of forces produced by the rotary motion of the wheel. The apparatus also includes support means for supporting the piston without friction during its oscillation within the pump, in order to generate pressurized air. It also includes suitable mounting means for fixing the pump to the wheel on which a tyre is fitted in such a way that the path of reciprocating motion of the piston is out of alignment with the centre and forms a tangent to a path of rotation of the wheel. Additionally, it includes suitable connection means for introducing into the tyre the pressurized air generated by the pump.

U.S. Pat. No. 5,667,606 describes an apparatus for pressurizing a tyre fitted on a wheel. The apparatus includes a displacement-type air pump, consisting of a combination of a cylinder and a spring-loaded piston. The pump has a casing suitable for being fixed axially to the wheel. The apparatus also includes a connecting conduit for pressurized air, suitable for introducing into the tyre the pressurized air generated by the pump. The apparatus also includes a cam and a cam follower mounted in the casing. The cam follower engages with the cam to create relative movements between them, caused by the cam, and is connected to the pump in order to drive it. A pendulum is mounted in the casing so that it rotates freely with respect to it. The pendulum is connected to one of the said cam and cam follower to keep this component essentially stationary with respect to the other, while the other of these components is fixed to the casing so that it rotates with it and provides the movement which drives the pump. The cylinder and piston combination has an axis of reciprocating motion of the piston in the cylinder which is essentially aligned with the axis of rotation of the wheel.

The apparatus of U.S. Pat. No. 5,409,049 makes use of the energy potentially contained and/or generated by a wheel of a motor vehicle when it is rotating. In particular, the apparatus makes use of the variation of the gravitational energy (weight) which occurs when use is made of a body which has an intrinsic weight applied to the wheel and which is free to move with respect to the rotating wheel.

The apparatus of U.S. Pat. No. 5,667,606 uses a cam, a cam follower and a pendulum to convert the rotary motion of the wheel into reciprocating motion of the pump piston.

These known apparatus are complicated, delicate and expensive. Moreover, they are positioned on the outside of the wheel. They are therefore subject to stresses and deformations which can cause frequent failure.

Another disadvantage lies in the fact that the application to the wheel of a body (a free oscillating piston or pendulum) having a specific intrinsic weight necessitates a precise balancing of not only the tyre but also the wheel, in order to achieve an acceptable uniformity of operation.

The objects of the present invention are a device and method for generating energy which can be used, for example, in order to carry out operations with pressurized air suitable for pressurizing a tyre during the running of a motor vehicle, which avoids the disadvantages of the known apparatuses.

SUMMARY OF THE INVENTION

In a first aspect, the invention relates to a device for generating energy in a rolling wheel, the said wheel including a tyre fitted on a rim, the said tyre having beads in contact with the said rim, characterized in that it includes at least one part which can move with respect to the said rim, the said moving part engaging with elastic means which keep it in contact with a predetermined portion of one of the said beads, the said moving part being provided with a reciprocating outward and return motion, against the action of the said elastic means, as a result of forces induced in the said moving part by a contact pressure which varies cyclically during each revolution of the said tyre and is exerted on the said moving part by the said predetermined portion of bead.

In a second aspect, the invention relates to a method for generating energy in a rolling wheel, the said wheel including a tyre fitted on a rim, the said tyre having beads in contact with the said rim, characterized in that it includes the steps of subjecting at least one part moving with respect to the rim to an elastic force which keeps it in contact with a predetermined portion of one of the beads, subjecting the moving part, by means of the predetermined portion of bead, to a contact pressure which varies cyclically during each revolution of the tyre to induce in the moving part forces capable of making it move with a reciprocating motion against the action of the elastic force.

The energy generated by means of the method and device is of the mechanical type. The present invention proposes the use of this energy in its initial state or its conversion to any other type of energy, such as electrical energy.

In a third aspect, the invention relates to a device for generating energy which can be used to carry out operations with pressurized air during the rolling of a tyre fitted on a rim, the tyre having beads in contact with the rim, the device including at least one plunger element and a chamber in which the plunger element is capable of moving with a reciprocating motion, the chamber being provided with first and second valve means, the first valve means being capable of putting the chamber into communication with the external environment, characterized in that the at least one plunger element includes a part which can move with respect to the rim, the moving part engaging with elastic means which keep it in contact with a predetermined portion of one of the beads, the predetermined portion of bead exerting on the moving part a contact pressure which varies cyclically during each revolution of the tyre, the cyclic variation of contact pressure inducing in the moving part forces capable of making it move against the action of the elastic means and of causing the plunger element to carry out alternate outward and return strokes in the chamber to compress air present in the chamber and to make it flow through the second valve means and to draw air from the external environment through the first valve means.

In one embodiment, the plunger element consists of the moving part and the elastic means consist of at least one spring which supports the moving part in the chamber, keeping it in a predetermined position with respect to the rim and in contact with the portion of bead.

In another embodiment, the plunger element consists of the moving part and a plate, these components being integral with each other and inclined at a predetermined angle to each other, and the elastic means consist of a torsion spring pivot which rotatably supports the plunger element and allows the plate to rotate in the chamber and allows the moving part to rotate in a cavity of the rim, the moving part being held by the torsion spring pivot in a predetermined position with respect to the rim and in contact with the portion of bead.

In a further embodiment, the plunger element consists of the moving part and a piston, these components being integral with each other, the longitudinal axis of the moving part and of the piston lying in an essentially radial direction with respect to the rim, the piston being movable in the chamber, and the elastic means consisting of at least one spring which supports the moving part in a cavity of the rim, holding it in a predetermined position with respect to the rim and in contact with the portion of bead.

The position of the start of the plunger stroke with respect to the rim is determined by the equilibrium between the pre-loading of the spring and the opposing force due to the total rigidity of the bead mixture and of a metallic bead wire which is included in the bead in a conventional way. This start of stroke position can be flush with the rim, or above or below it, and is determined according to the desired stroke of the plunger element.

Preferably, the moving part and the piston are joined by a rod provided with an adjustable stroke limiting means.

Advantageously, the moving part is a disc housed in a seat in the rim.

Typically, the second valve means are capable of putting the chamber into communication with the interior of the tyre.

Preferably, the device also includes a compressed air reservoir communicating with the chamber through the second valve means.

Even more preferably, the reservoir communicates with the interior of the tyre through further valve means capable of making the compressed air flow into the interior of the tyre.

Advantageously, the device is operationally connected to a regulating unit, which includes a pressure sensor capable of measuring the pressure within the tyre, and a control unit capable of causing the opening and closing of the further valve means to regulate the inflation pressure of the tyre according to a predetermined mapping.

The device according to the invention is based on a phenomenon which has been observed by the applicant during the rolling of a tyre fitted on a rim. This phenomenon consists in a cyclic variation of the contact pressure which is found between the surface of the tyre bead and the corresponding surface of the rim. This cyclic variation of contact pressure is used in the present invention to generate energy which can be used for moving mechanical members. In the specific embodiment of the invention described below, the mechanical members are designed to generate pressurized air which can be used to regulate the inflation pressure of the rolling tyre.

Essentially, in the device according to the invention, the moving part slides or rotates in the chamber or in the cavity of the rim and is kept in contact with the rim by the elastic means. The variation of contact pressure between the bead and the rim which occurs during the rolling of the tyre causes the moving part to be displaced in the chamber or in the cavity of the rim against the action of the elastic means. As it is displaced, the moving part causes a change of volume in the chamber and consequently generates a flow of pressurized air. The pressurized air is sent into a reservoir in which it is stored. When the pressure inside the tyre is lower than the predetermined level, the pressurized air passes from the reservoir to the interior of the tyre. When the pressure inside the tyre reaches the predetermined level and the reservoir is full, the excess air is discharged to the exterior. The first and second valve means ensure the correct flow of air into and out of the chamber.

The device according to the present invention uses the variation of contact pressure which occurs, during the rolling of the tyre, in a predetermined contact area between the bead and the rim, and requires only minor modifications of the rim, while it does not require bodies or mechanisms associated with the moving tyre or with an external energy source.

The device according to the invention enables the pressure inside the tyre to be brought to the requisite levels at each instant. Thus the wear and rolling resistance are minimized, and optimal roadholding and efficient braking are provided. The device according to the invention therefore makes the driving of the motor vehicle safer.

More particularly the device makes it possible to modify the level of pressure inside the tyre in relation to the running conditions of the vehicle. For example, it is possible to have a lower pressure inside the tyre during running in urban areas, where rough and irregular road surfaces are frequently encountered, and a higher pressure during running outside urban areas, generally on roads with very smooth surfaces, where the vehicle can travel at higher speed. Thus comfort is optimized during running in urban areas and fuel consumption is optimized during running outside urban areas. In other situations also, during the movement of the vehicle, it is possible to have lower tyre pressures, for example when greater traction is required (for running on snow), or higher pressures, for example in high speed travel with heavy loads and/or in climatic conditions with very high temperatures.

The active regulation of pressure inside the tyres during the running of the motor vehicle can be combined with the active regulation of the rigidity and the damping of the suspension with the aim of a marked improvement of the comfort and roadholding. This permits optimal control of the motor vehicle in terms of safety, comfort and fuel consumption, since all interventions are controlled in an integrated way.

In a fourth aspect, the present invention relates to a rim for a tyre, provided with a device for generating energy which can be used to carry out operations with pressurized air during the rolling of the said tyre, the said device including at least one plunger element and a chamber in which the said plunger element can move with a reciprocating motion, the said chamber being provided with first and second valve means, the said first valve means being capable of putting the said chamber into communication with the external environment, characterized in that the said at least one plunger element includes a part which can move with respect to the said rim, the said moving part engaging with elastic means which hold it in a predetermined position with respect to the said rim so that it comes into contact with a predetermined portion of a bead of the said tyre, the said predetermined portion of bead exerting on the said moving part a contact pressure which varies cyclically during each revolution of the said tyre, the said cyclic variation of contact pressure producing forces on the said moving part which are capable of causing it to move against the action of the said elastic means and of causing the said plunger element to carry out alternate outward and return strokes in the said chamber to compress air present in the said chamber and to force it to flow through the said second valve means, and to draw air from the external environment through the said first valve means.

In a fifth aspect, the present invention relates to a wheel for a motor vehicle, having a tyre fitted on a rim and a device mounted on the said rim for generating energy which can be used to carry out operations with pressurized air during the rolling of the said tyre, the said tyre having beads in contact with the said rim, the said device including at least one plunger element and a chamber in which the said plunger element can move with a reciprocating motion, the said chamber being provided with first and second valve means, the said first valve means being capable of putting the said chamber into communication with the external environment, characterized in that the said at least one plunger element includes a part which can move with respect to the said rim, the said moving part engaging with elastic means which hold it in a predetermined position with respect to the said rim so that it comes into contact with a predetermined portion of one of the said beads, the said predetermined portion of bead exerting on the said moving part a contact pressure which varies cyclically during each revolution of the said tyre, the said cyclic variation of contact pressure producing forces on the said moving part which are capable of causing it to move against the action of the said elastic means and of causing the said plunger element to carry out alternate outward and return strokes in the said chamber to compress air present in the said chamber and to force it to flow through the said second valve means, and to draw air from the external environment through the said first valve means.

BRIEF DESCRIPTION OF THE DRAWINGS

Characteristics and advantages of the invention will now be illustrated with reference to embodiments shown by way of example, without restrictive intent, in the attached figures in which:

FIG. 15 shows schematically a unit for active regulation of the pressure inside the tyre of FIG. 1 or FIG. 3;

FIG. 16 shows schematically an apparatus for regulating the pressure inside the tyre of FIG. 1 or FIG. 3.

DETAILED DESCRIPTION OF THE EMBODIMENTS

Figure 1:
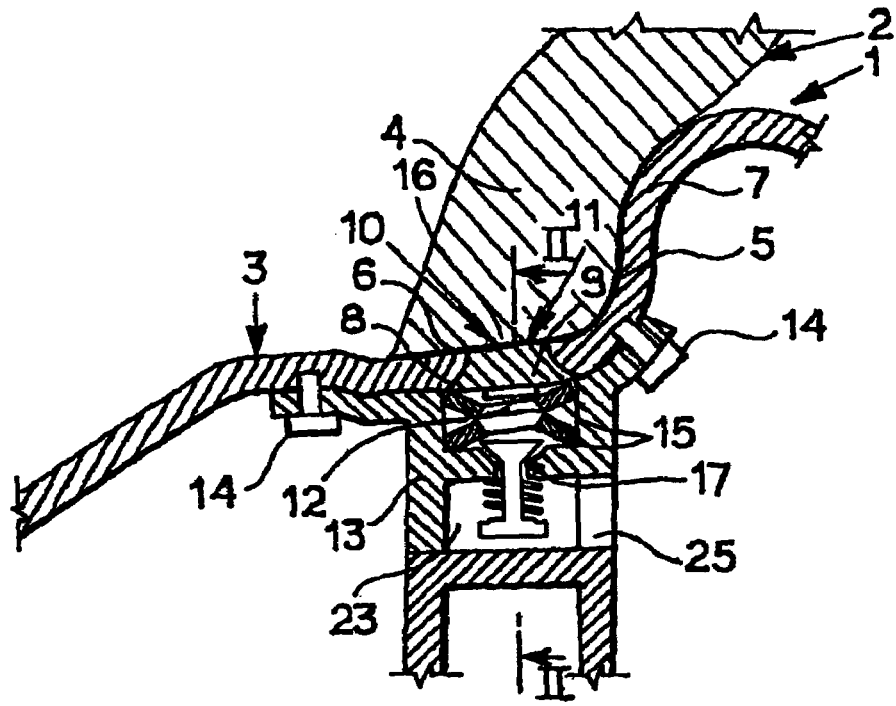
FIG. 1 is a partial view, in cross section, of a tyre and a rim with which is associated a device for generating mechanical energy, made according to the invention.
Figure 2:
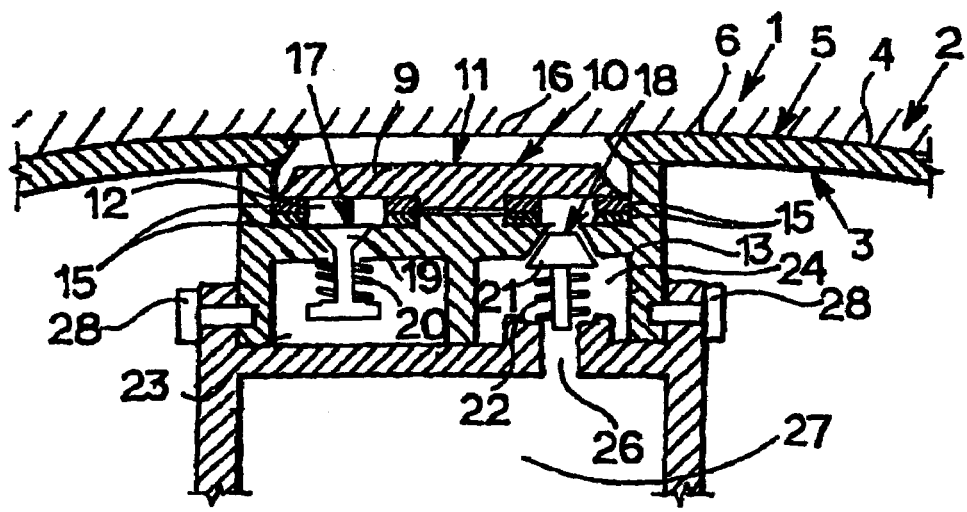
FIG. 2 is a sectional view along the plane II—II of FIG. 1.

FIGS. 1 and 2 show part of a wheel 1 for a motor vehicle, including a tyre 2 and a rim 3 on which the tyre is fitted. The tyre has a bead 4 which is housed in a seat 5 of the rim 3. The seat 5 is formed by a base 6 and a rim wall 7. The wheel 1 is associated with a device 10 for generating energy, particularly mechanical energy, which in the illustrated case is used to carry out operations with pressurized air during the rolling of the tyre 2. The device 10 includes a plunger element 11 and a chamber 12 lying under this element, in which the plunger element 11 can slide with a reciprocating motion in an airtight way. The plunger element 11 is formed by a moving part consisting of a disc 9, separate from the base 6 of the rim and housed in a cylindrical seat 8. The chamber 12 is formed in a structure 13 which is fixed to the rim 3 by screws 14. The disc 9 is supported in the chamber 12 by Belleville springs 15 which keep it in contact with a surface portion 16 of the bead 4 and flush with the base 6 of the rim 3. Similar results are obtained if laminated springs, leaf springs, coil springs or the like are used in place of Belleville springs.

The portion of bead 4 exerts a contact pressure on the plunger element 11, this pressure varying cyclically during each revolution of the wheel 1, and induces in this element forces which can make it move against the action of the springs 15, as illustrated below with reference to FIG. 7.

The chamber 12 is provided with two non-return valves 17 and 18 (FIG. 2) including, respectively, a truncated conical shutter 19, subject to the action of a spring 20, and a truncated conical shutter 21, subject to the action of a spring 22.

The valves 17 and 18 put the chamber 12 into communication with a compartment 23 and a compartment 24 respectively, formed in the structure 13. The compartment 23 communicates freely with the external environment through an aperture 25. The compartment 24 communicates, through an aperture 26, with a pressurized air storage reservoir 27 which is fixed to the structure 13 by screws 28. The reservoir 27, in turn, is connected to an ordinary tyre pressurization valve or to a solenoid-operated valve which performs a similar function.

In another embodiment of the invention, the reservoir 27 is connected to a compressed-air turbine which supplies the operating energy to other devices or services located on the wheel.

The device 10 operates by making use of the variation of the contact pressure, observed by the applicant, which occurs, during the rolling of the tyre 2, between the surface portion 16 of the bead 4 and the rim 3 on which the tyre 2 is fitted.

Figure 5:
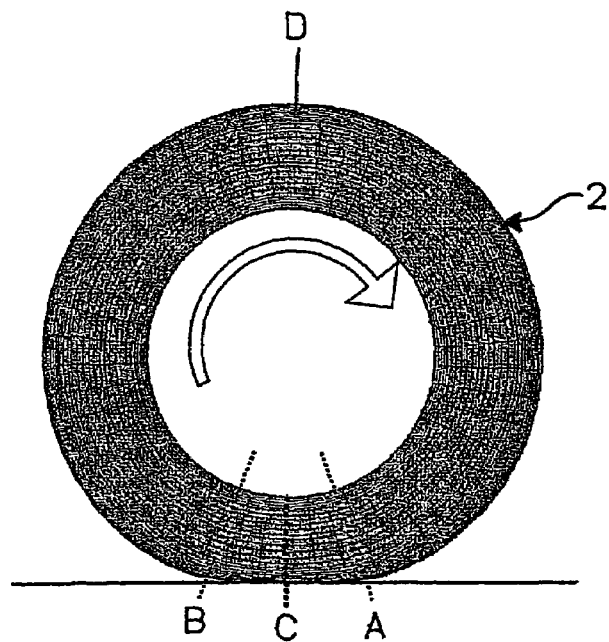
FIG. 5 is a side view of a tyre which is rolling on the ground.

During the rolling of the tyre, the contact area between the bead 4 and the rim 3 is initially close to the road surface, immediately above the footprint, and is subsequently distant from the footprint. In FIG. 5, the portion of the tyre located in the footprint is delimited by A and B. As it moves from the position AB of FIG. 5 to the opposite position D (known in the art as the "over-inflated area"), the profile of the tyre sidewalls is modified and the reactive forces between the beads and the rim vary.

Figure 6:
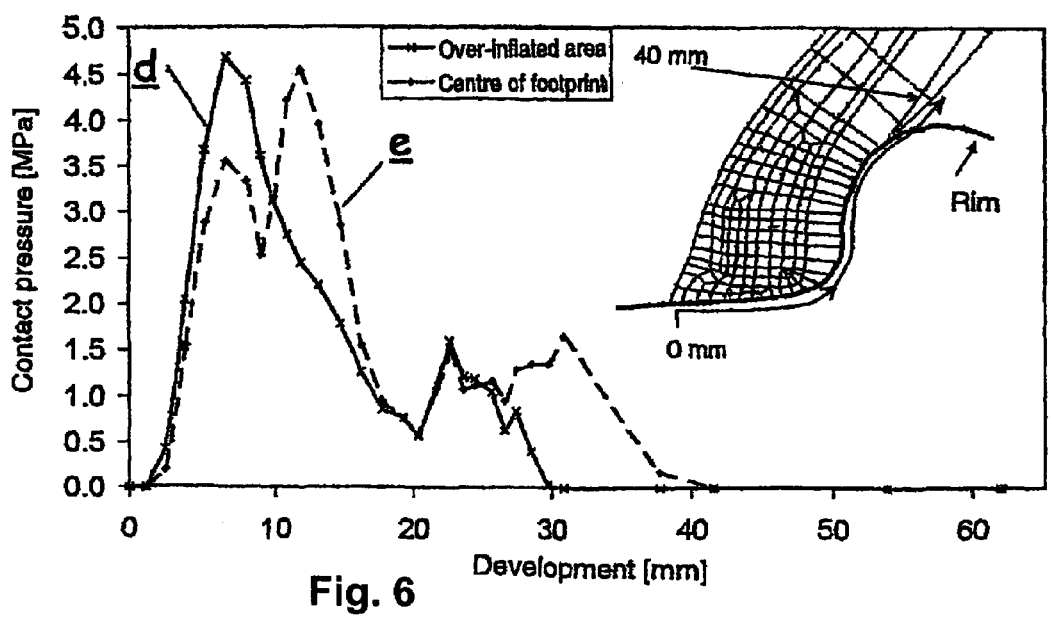
FIG. 6 is a graph showing the variation of the pressures along a contact line in a transverse direction between a bead of a tyre and a rim, in two diametrically opposite positions of the tyre.

The applicant has observed that the contact pressures between the bead and the rim vary according to the position along the axial development of the contact line between the bead and the rim. This contact line is formed by the intersection of the bead with a transverse section plane, as shown in the insert in the graph of FIG. 6. The graph of FIG. 6 shows the variation of the bead-rim contact pressures in flattening with a load of 600 kg. It can be seen that, in conditions of simple inflation, the distribution of contact pressures at the rim is identical at all circumferential positions. In vertical load conditions (flattening), the distribution of pressures at the rim changes with the circumferential position, and the variation of the contact pressures between the bead and the rim is represented by the curve e in FIG. 6 in the centre of the footprint (point C in FIG. 5) and is represented by the curve d at the opposite point (point D in FIG. 5).

Figure 7:
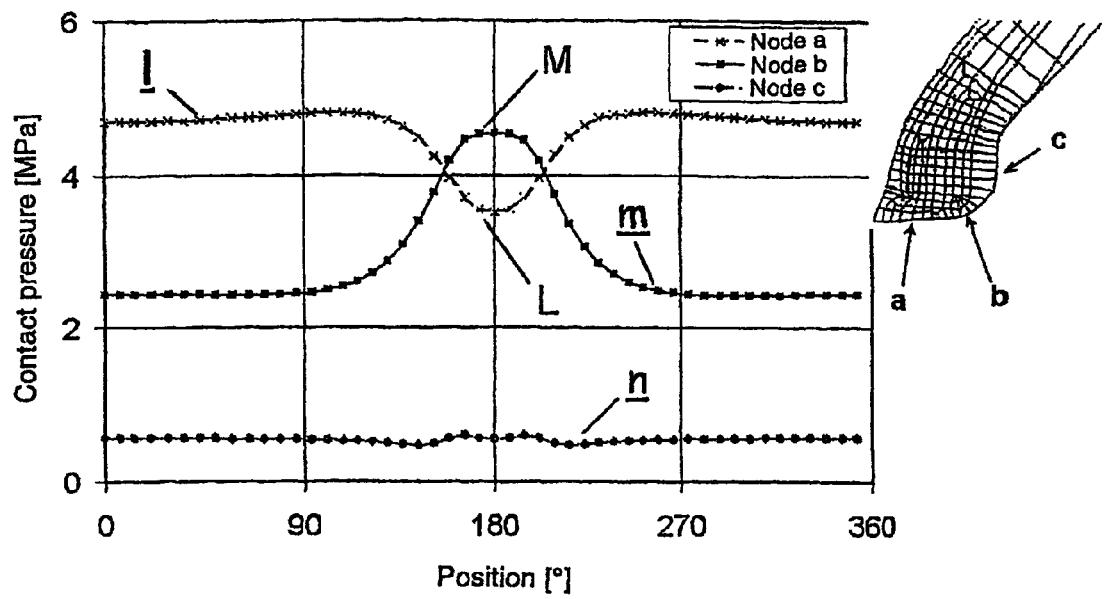
FIG. 7 is a graph showing the cyclic variation of the pressures on a contact area between the bead and rim along three different circumferential lines.

FIG. 7 shows the (cyclical) variations of the contact pressures between the bead and the rim under load from the circumferential position (in other words along the circumferential development of the bead), at the nodes (points) a, b, c, shown in the drawing of the bead placed at the side. The variation of the rim pressure at the node a is represented by the curve l while the variation at the node b is represented by the curve m and the variation at the node c is represented by the curve n. The curve l shows that the pressure between the bead and the wall of the rim in contact with the bead undergoes a variation, during one cycle of rotation of the tyre, consisting in an essentially sinusoidal oscillation moving from a normal constant value to a minimum value L when the node a is in the centre of the footprint (the 180° position). The curve m shows that the pressure undergoes a variation consisting in an essentially sinusoidal oscillation moving from a normal constant value to a maximum value M when the node b is in the centre of the footprint. The curve n shows that the pressure at the node c remains essentially constant during the whole cycle of rotation of the tyre.

The curves l, m and n of FIG. 7 relate to the nodes, or points, a, b and c of the bead, and therefore relate to what takes place in different positions of the bead-rim contact surface during one cycle of rotation of the tyre. By an analysis of these curves, carried out for example by the finite elements calculation method, it is possible to select the optimal position (in other words, the position with the greatest variation of contact pressure) in which the device to which the invention relates can be located.

The device 10 according to the invention makes use of the variation of the contact pressure which takes place in one cycle of rotation of the tyre, in the area of the node b, defined as the optimal node, for generating energy. In the type of application described here, this energy is used to generate compressed air which can be used to regulate the pressure of the tyre during the running of the motor vehicle.

When a given tread area of the tyre comes into the proximity of the contact with the ground (point A in FIG. 5), the contact pressure in the corresponding surface portion 16 of the bead which is in contact with the disc 9 of the plunger element 11 increases from the normal constant value to the maximum value M (curve m in FIG. 7). In these conditions, the surface portion 16 of the bead exerts on the plunger element 11 a force capable of overcoming the pre-loading of the Belleville springs 15 and making the element slide in an airtight way in the chamber 12, from the start of the stroke position in FIG. 1 to the stroke end position in FIG. 2. The plunger element 11 thus carries out an outward stroke, in which it compresses the air present inside the chamber 12 until it reaches the value capable of opening the valve 18, overcoming the force exerted by the spring 22 on the shutter 21. The pressurized air flows through the valve 18 from the chamber 12 towards the compartment 24 and the reservoir 27. From the reservoir 27, it is sent to the ordinary pressurization valve of the tyre 2, or to a solenoid-operated valve which carries out similar functions when the air pressure inside the tyre has to be regulated.

When the aforesaid tread area moves away from the centre of the footprint and then leaves it (point B in FIG. 5), the pressure in the surface portion 16 of the bead, at the interface with the plunger element 11, decreases from the maximum value M to the normal constant value (curve m in FIG. 7). The plunger element 11 is pushed by the Belleville springs 15 so that it slides into the chamber 12 until it is again flush with the base 6 of the rim 3. In the return stroke, the plunger element 11 creates within the chamber 12 a pressure drop which causes the valve 17 to open by overcoming the force exerted by the spring 20 on the shutter 19. Thus the external air flows from the compartment 23 through the valve 17 into the chamber 12, where it is compressed by the plunger element 11 during the next revolution of the wheel 1.

Figure 3:
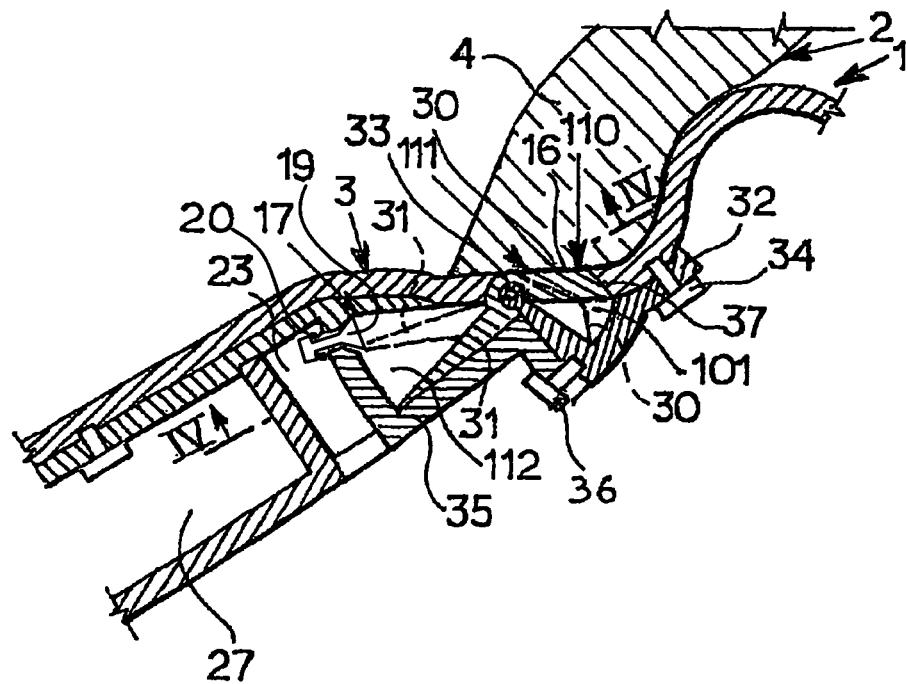
FIG. 3 is a partial view, in cross section, of a tyre and a rim with which is associated a device for generating mechanical energy which is a variant of that in FIG. 1.
Figure 4:
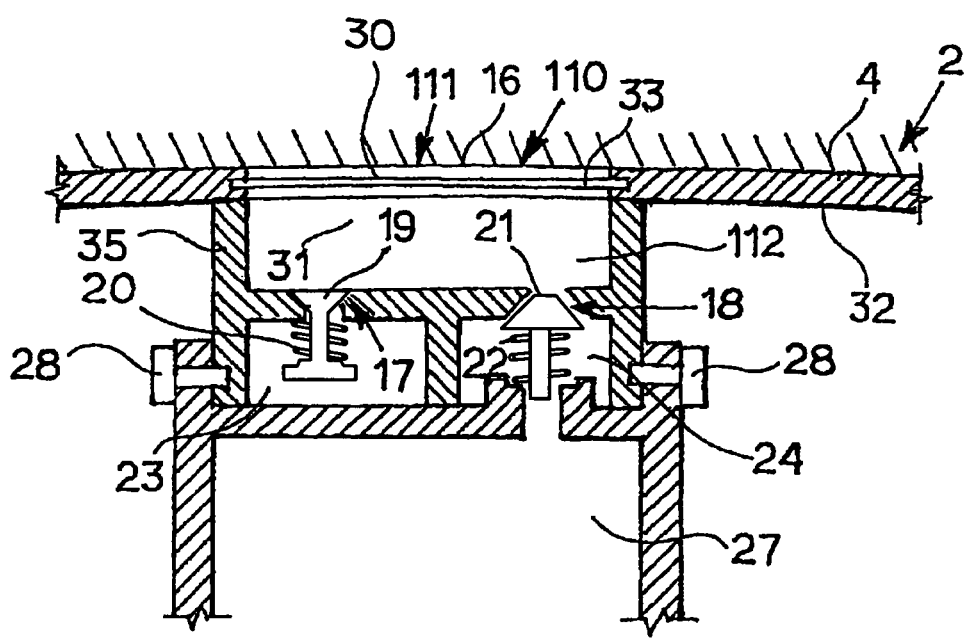
FIG. 4 is a sectional view along the plane IV—IV of FIG. 3.

FIGS. 3 and 4 show a device 110 for generating mechanical energy, which in this case also is used to carry out operations with pressurized air, associated with the tyre 2 and the rim 3. The device 110 includes a plunger element 111 which, in turn, includes a moving disc 30 and a plate 31. The disc 30 and the plate 31 are integral with each other and inclined at a predetermined angle to each other. The plunger element 111 therefore has the shape of a lever with two arms. The disc 30 is housed in a seat 37 of the base 6. The plunger element 111 is rotatably supported in a structure 32 by a pivot 33 formed by a torsion spring. The structure 32 is fixed to the rim 3 by screws 34, and a structure 35 is fixed to the rim 3 and to the structure 32 by screws 36. A cavity 101 in which the disc 30 can rotate is formed in the structure 32. A chamber 112 in which the plate 31 can rotate is formed in the structure 35. The chamber 112 is provided with the non-return valves 17 and 18 which put it into communication with the compartments 23 and 24 respectively. The compartments 23 and 24, in turn, communicate, respectively, with the external environment and with the pressurized air storage reservoir 27.

The torsion spring pivot 33 keeps the plunger element 111 at the start of the stroke, as shown in FIG. 3, in which the disc 30 is flush with the base 6 of the rim 3 and is in contact with the surface portion 16 of the bead 4. The surface portion 16 of the bead exerts on the plunger element 111 a contact pressure which varies cyclically with the variation represented by the curve m in FIG. 7.

The device 110 operates in a similar way to the device 10 of FIGS. 1 and 2.

When the pressure at the interface between the surface portion 16 of the bead and the disc 30 increases from the normal constant value to the maximum value M (curve m in FIG. 7), the surface portion 16 of the bead exerts on the disc 30 a force capable of overcoming the action of the torsion spring of the pivot 33, and of making the plunger element 111 rotate in the clockwise direction according to FIG. 3. The plunger element 111 moves from the start of the stroke, represented in solid lines, to the end of the stroke, represented by a broken line in FIG. 3. The disc 30 rotates in the cavity 101 and the plate 31 rotates in the chamber 112. The plate 31 carries out an outward stroke in which it compresses the air present inside the chamber 112 until the air pressure reaches a level capable of opening the valve 18. The pressurized air therefore flows from the chamber 112 towards the compartment 24 and the reservoir 27.

When the pressure at the interface between the surface portion 16 of the bead and the disc 30 decreases from the maximum value M to the normal constant value (curve m in FIG. 7), the plunger element 111 is pushed by the torsion spring of the pivot 33 so that it rotates in the anti-clockwise direction according to FIG. 3. The disc 30 and the plate 31 carry out a return stroke, creating a pressure drop inside the chamber 112, until the disc 30 is again flush with the base 6 of the bead 4. When the pressure drop reaches the value capable of opening the valve 17, the external air flows from the compartment 23 into the chamber 112, where it is compressed in the next revolution of the wheel 1.

The plunger element 111 is shaped in the form of a lever with a shorter arm 30 and a longer arm 31. This enables the compression ratio to be increased above that of the device 10, and makes it possible to utilize the cyclic variation of the arm of the resultant of the distribution of the contact pressure.

The position of the start of the stroke of the plunger element 11 or 111 with respect to the base 6 of the rim is determined by the equilibrium between the pre-loading of the spring 15 or 33 and the opposing force due to the rigidity of the mixture of the bead 4 and of a bead wire (not shown) which is conventionally included in the bead.

The rigidity of the mixture of the bead and of the rim varies from 10 to 18 MPa.

In the embodiments shown in FIGS. 1, 2, 3 and 4, the plunger elements 11 and 111 have a start of stroke position in which the discs 9 and 30 are flush with the base 6. However, the discs could be in a position above or below the base 6. The start of stroke position is selected according to the stroke of the plunger element. The length of the stroke depends on the deformability of the bead, and, in particular, on the rubber compressed between the radially inner surface of the bead wire and the surface of the rim, the elastic means chosen, and the type of tyre used. The length of this stroke lies in the range from 1.5 to 5 mm and is, for example, 2–2.5 mm.

It should be noted that these excursion values are not large in absolute terms, but the frequency of the excursion is considerable. At a speed of 120 km/hr, for example, it is of the order of 20 cycles per second, varying with the size of the tyre.

Figure 8:
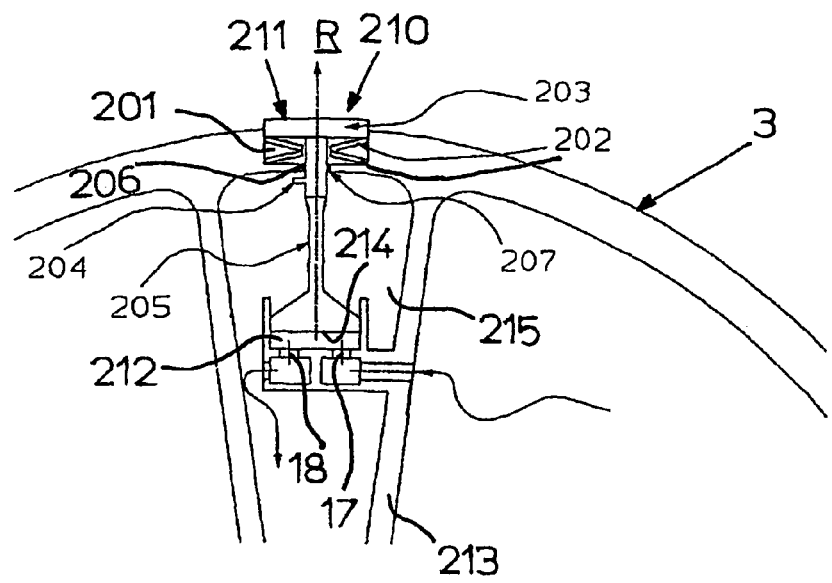
FIGS. 8, 9 and 10 show another variant of the device for generating mechanical energy shown in FIG. 1.
Figure 10:
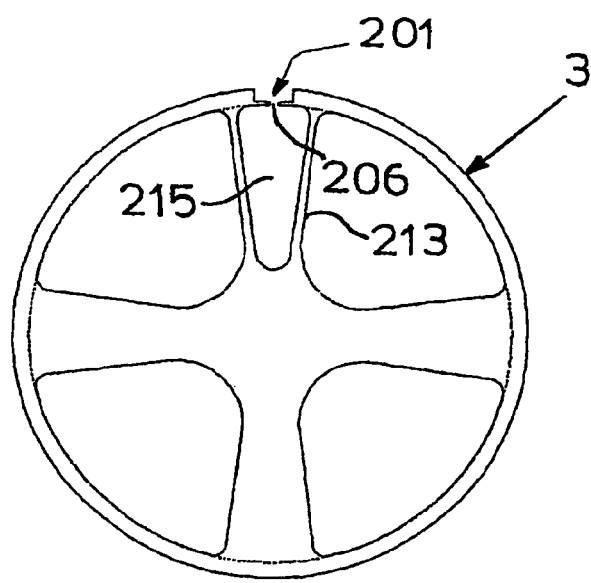

FIG. 8 shows a device 210 for generating mechanical energy which can be used to carry out operations with pressurized air during the rolling of the tyre 2. The device 210 includes a plunger element 211 which, in turn, includes a moving disc 203, a rod 205 and a piston 214. The rod 205 is integral with the disc 203 and with the piston 214. The disc 203 is housed in a cavity 201 of the base 6; the springs 202 keep it in contact with the surface portion 16 of the bead. The disc 203 slides in the cavity 201, and springs 202 cause the disc 203 to lie in a start of stroke position in which it is raised with respect to the base 6 in such a way that its stroke is facilitated. The cavity 201 is provided with a hole 206 (FIG. 10) into which the rod 205 passes. A seal 207, surrounding the rod 205 and ensuring the airtightness of the cavity 201, is fitted in the hole 206. The rod 205 is integral with a stroke limiter 204. The rod 205 extends into a recess 215 formed in a spoke 213 of the rim 3. In the spoke 213 there is also a chamber 212 in which the piston 214 can slide in an airtight way. The longitudinal axis of the disc 203, the rod 205 and the piston 214 lies along a radius R of the spoke 213. The chamber 212 is provided with non-return valves 17 and 18 which put it into communication, respectively, with the external environment and with the pressurized air storage reservoir 27.

Figure 9:
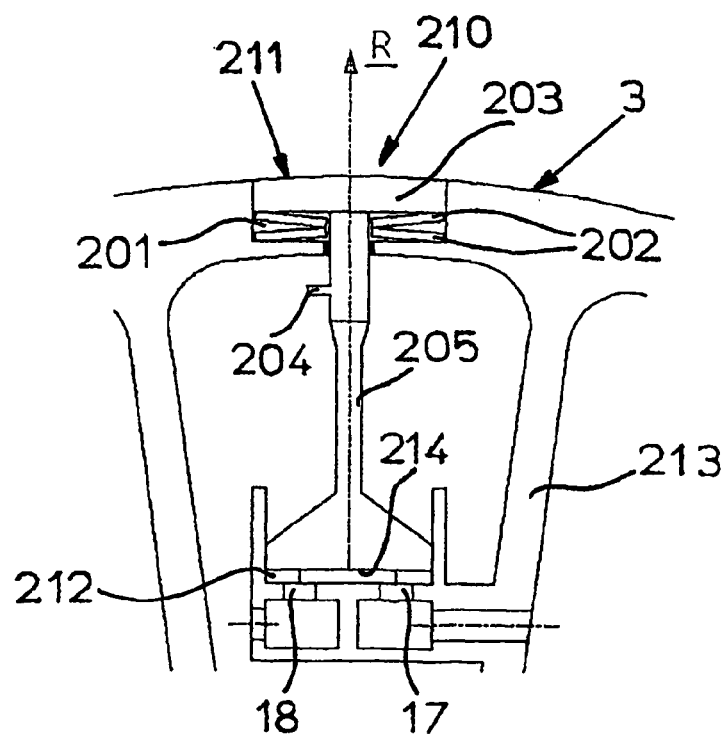

With each revolution of the wheel 1, the disc 203 is subjected to the action of forces which vary as a result of the cyclic oscillation of the contact pressure which the surface portion 16 of the bead exerts on the disc 203. In the presence of these forces, the disc 203 moves with a reciprocating motion in the cavity 201, being displaced in the radial direction along the directrix R from the position shown in FIG. 8 to the position shown in FIG. 9, and vice versa.

The reciprocating motion of the disc 203 is transmitted to the piston 214 through the rod 205. The piston 214 slides in an airtight way in the chamber 212 and carries out alternate outward and return strokes, moving in the radial direction along the directrix R. In the outward strokes, the piston 214 compresses the air present within the chamber 212 and discharges it through the valve 18, and in the return strokes it draws air from the exterior through the valve 17.

The plunger element 211 can be miniaturized to limit the overall dimensions and weight.

Figure 11:
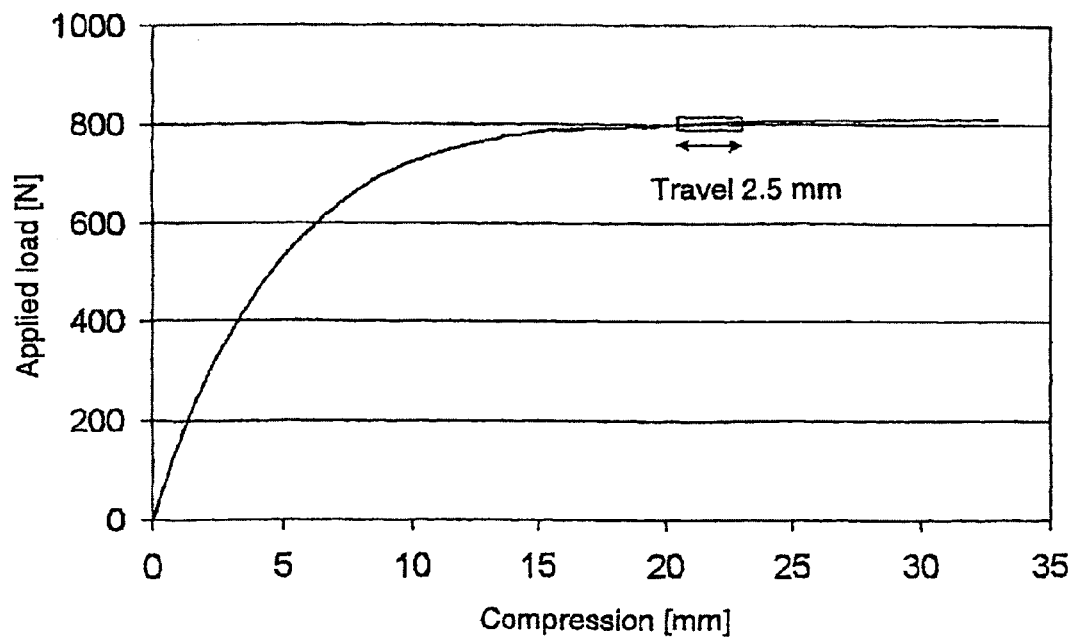
FIG. 11 is a graph which shows a characteristic of a spring of the device of FIG. 8.

In order to apply the device 210 to a 205/55 R16 tyre, a spring 202, having the mechanical load (force)-compression characteristic shown in FIG. 11, was selected. FIG. 11 shows that, after a first part of the curve with a very steep slope (high rigidity), there is a practically flat part (low rigidity). The point of change of slope is reached at a load of 700 N and a compression of 10 mm. The springs 202 are calibrated in such a way that they operate with a specified travel of 2.5 mm in response to a force variation of a few tens of newtons (the area identified by a rectangle in FIG. 11). The springs 202 therefore operate in the less sloping part of the curve, having "absorbed" a static pre-loading (due to the contact pressure between the surface portion 16 of the bead and the disc 203, in the position shown in FIG. 8) as shown by the steeply sloping part of the characteristic curve.

In other embodiments of the invention, the rod 205 can be connected to suitable mechanisms, of the crankshaft and connecting rod type or the rack and pinion type for example, which are known and are therefore not shown here, to operate devices capable of generating other kinds of energy, for example electrical energy for supplying sensors and transducers of various types which may be fitted on the wheel.

Figure 12:
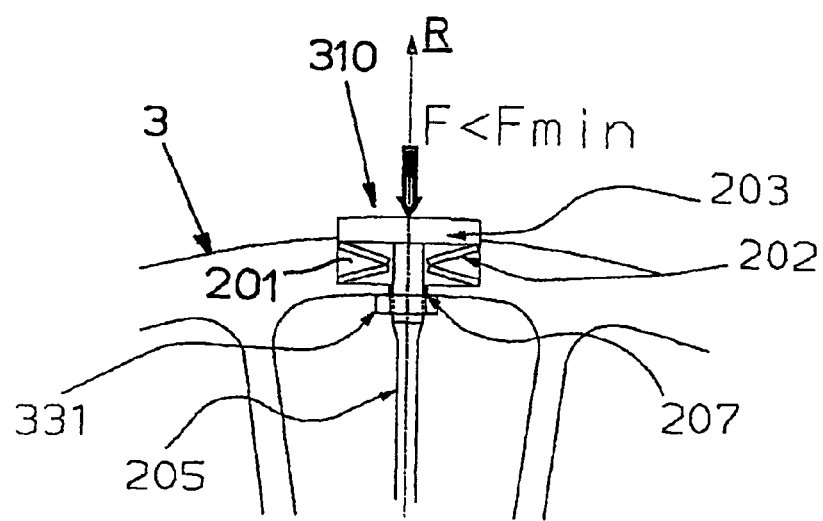
FIG. 12 shows a variant of the device of FIG. 8.

FIG. 12 shows a device 310 for generating mechanical energy which can be used for carrying out operations with pressurized air, which is a variant of the device of FIG. 8 and in which identical parts are indicated by the same numbers.

The rod 205, which links the disc 203 and the piston 214 of the plunger element 211, is provided with a nut 331 which acts as a stroke limiter. By adjusting the nut 331, it is possible to modify the free travel of the springs 202 and consequently the minimum load Fmin to be applied to the plunger element 211 in order to obtain even a minimum excursion of the piston 214. In the device 310, the end of stroke position is selected according to the pressure which is to be maintained within the tyre during its rolling.

Figure 13:
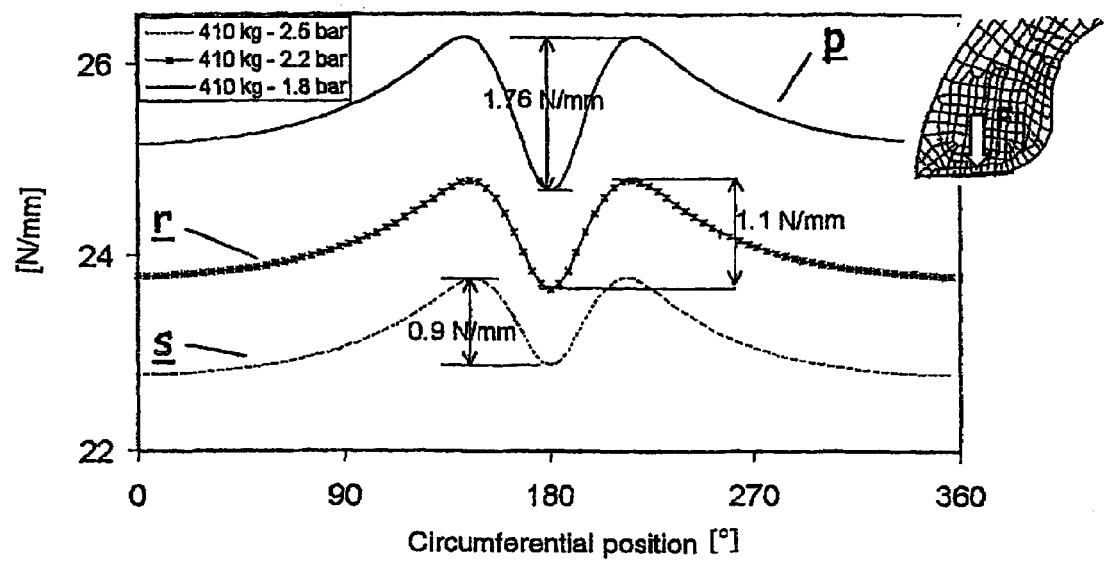
FIG. 13 is a graph which shows the variation, during a wheel revolution expressed in degrees, of forces per unit of circumferential length, acting in the device of FIG. 12 for different values of inflation pressure.

The device 310 is based on a phenomenon, observed by the applicant, by which, as the internal pressure of the tyre varies, the force F per unit of circumferential length due to the contact pressure in the portion of surface 16 between the bead and rim varies as shown by the curves p, r and s in FIG. 13, as a function of the circumferential position expressed in degrees. The curves p, r and s relate to different values of inflation pressure (1.8 bars, 2.2 bars and 2.5 bars respectively) and show that the mean value of the force F varies with the inflation pressure of the tyre and increases as the inflation pressure decreases. In turn, the excursion of the force, in other words the difference between the maximum and minimum value of the force, during one revolution of the wheel, increases significantly as the pressure decreases, as shown in FIG. 13.

The device 310 makes it possible to restore and maintain a predetermined pressure within the tyre even when the inflation pressure tends to decrease. Since the mean value of the contact force F between the bead and the disc 203 decreases as the internal pressure of the tyre increases, the force F acting on the plunger element 211 becomes less than the minimum value Fmin when a predetermined pressure is reached. When the value of the contact force F falls below the value corresponding to the desired internal pressure, the stroke limiter 331 prevents the plunger element 211 from moving to a larger radius and therefore prevents its excursion. The plunger element 211 is blocked and the device 310 ceases to generate pressurized air. The blocking point depends on the calibration of the springs 202 and on the position of the stroke limiter 331.

The principal advantage of the device 310 consists in the fact that the efficiency of pumping increases as the internal pressure of the tyre decreases, since the differences between the maximum and minimum force F increase during the cycle as the inflation pressure decreases. This provides efficient, rapid and safe reinflation of the tyre when necessary, in other words when the internal pressure is low. When the nominal operating pressure, for example 2.5 bars, is reached, the pumping efficiency is reduced, ensuring that the optimal pressure is not exceeded.

Thus the operating cycles of the plunger element are reduced and the generation of compressed air is prevented when it is not required, and therefore compressed air does not have to be vented to the exterior of the tyre.

Figure 14:
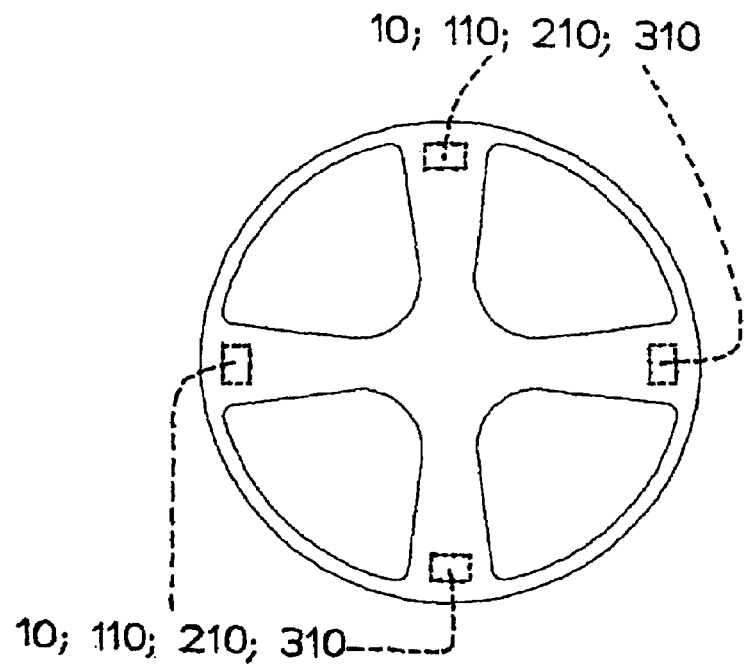
FIG. 14 shows schematically a rim provided with four devices for generating mechanical energy.

The described devices 10, 110, 210 and 310 can be fitted in a plurality of positions, for example 4 or 6 positions, which are spaced at equal intervals along the circumference of the rim under the bead (FIG. 14). Each device stores air in a corresponding reservoir 27 and the different reservoirs which may or may not communicate with each other (in the centre if they extend radially, or laterally if they extend circumferentially).

The described devices 10, 110, 210 and 310 can be used for active regulation of the pressure within the tyre 2.

FIG. 15 is a block diagram of a unit 40 for active regulation of the pressure within the tyre 2. The unit 40 includes a sensor 41 for measuring the pressure within the tyre, a device 10 or 110 or 210 or 310 for generating mechanical energy which can be used to carry out operations with pressurized air, a controller 42 capable of controlling the inflation pressure of the tyre according to mappings defined by suitable algorithms, and a solenoid-operated tour-way valve 43 which puts the reservoir 27 into communication with the interior of the tyre 2 and puts the interior of the tyre 2 into communication with the external environment. The controller 42 makes the solenoid-operated valve 43 open to introduce pressurized air into the interior of the tyre, or to remove air from the interior of the tyre, according to the pressure measured in the tyre, the running conditions and the decisions made by the driver.

FIG. 16 shows an apparatus 300 for regulating the pressure within the tyre, comprising a three-way valve 190, valves 191 and 192, and a reservoir 199. The valve 190 is connected through a duct, represented by the arrow 193, to a device 10 or 110 or 210 or 310 for generating mechanical energy which can be used to carry out operations with pressurized air, and through ducts 194 and 195 to the valve 191 and the valve 192 respectively. The valves 191 and 192 are connected through ducts 196, 197 and 198 to the reservoir 199. The reservoir 199, in turn, is connected to the interior of the tyre 2. The valve 190 is operated by a signal generated on board the vehicle, for example a signal emitted by a controller, similar to the controller 42 in FIG. 15, which operates in accordance with logics for optimizing the behaviour of the motor vehicle, or a signal generated manually by a driver. The valve 190 enables the pressurized air from the reservoir 27 of the device 10 or 110 or 210 or 310 to flow through the duct 194 or through the duct 195.

If the pressurized air passes through the duct 194, the valve 191 allows the air to enter the reservoir 199 when the pressure within the reservoir is lower than a calibration value $p_2$. On the other hand, if the pressure within the reservoir is greater than the calibration value $p_2$, the valve 191 discharges air to the exterior (arrow U1).

If the pressurized air passes through the duct 195, the valve 192 acts in a similar way to the valve 191, but operates at a calibration pressure $p_1$ which is different from the pressure $p_2$.

The apparatus 300 allows the pressure within the tyre to be held constant at the desired value, $p_1$ or $p_2$.

For a 195/65R15 tyre, for example, the pressure value $p_1$ equal to 2.3 bars is optimal for travel outside urban areas, and for lower fuel consumption, while the value $p_2$ equal to 2.1 bars is optimal for travel in urban areas.

The apparatus also has the advantage of eliminating the troublesome necessity of restoring the pressure value within the tyre at petrol stations or at appropriate pumping locations.

The invention claimed is:

1. A device for generating energy in a rolling wheel, comprising:
   at least one part that can move with respect to a rim of the wheel;

wherein the wheel comprises a tyre fitted on the rim,
wherein the tyre comprises beads in contact with the rim,
wherein the at least one movable part is engaged with elastic means that keep the at least one movable part in contact with a predetermined portion of one of the tyre beads,
wherein the at least one movable part undergoes reciprocating outward and return motion, against action of the elastic means, as a result of forces induced in the at least one movable part by contact pressure that varies cyclically during each revolution of the tyre, and
wherein the contact pressure is exerted on the at least one movable part by the predetermined portion of one of the tyre beads.

2. A method for generating energy in a rolling wheel, comprising:
subjecting at least one part of the wheel, movable with respect to a rim of the wheel, to elastic force that keeps the at least one movable part in contact with a predetermined bead portion of a tyre of the wheel; and
subjecting the at least one movable part, using the predetermined bead portion, to contact pressure that varies cyclically during each revolution of the tyre, to induce in the at least one movable part forces capable of making the at least one movable part move with reciprocating motion against an action of the elastic force;
wherein the wheel comprises the tyre fitted on the rim, and
wherein the tyre comprises beads in contact with the rim.

3. A device for generating energy during rolling of a tyre fitted on a rim, comprising:
at least one plunger element; and
a chamber in which the at least one plunger element can move with reciprocating motion;
wherein the tyre comprises beads in contact with the rim,
wherein the at least one plunger element comprises at least one part that can move with respect to the rim,
wherein the at least one movable part is engaged with elastic means that keep the at least one movable part in contact with a predetermined portion of one of the tyre beads,
wherein the predetermined portion exerts on the at least one movable part contact pressure that varies cyclically during each revolution of the tyre,
wherein the chamber comprises first and second valve means,
wherein the cyclic variation of the contact pressure causes the at least one movable part to move against action of the elastic means, compressing air present in the chamber using alternate outward and return strokes of the at least one plunger element,
wherein at least some of the compressed air flows through the second valve means,
wherein at least some air is drawn from an external environment into the chamber through the first valve means, and
wherein the generated energy can be used to carry out operations with pressurized air during the rolling of the tyre.

4. The device of claim 3, wherein the at least one plunger element consists of the at least one movable part,
wherein the elastic means comprises at least one spring supporting the at least one movable part in the chamber,
wherein the at least one spring keeps the at least one movable part in a predetermined position with respect to the rim, and
wherein the at least one spring keeps the at least one movable part in contact with the predetermined portion.

5. The device of claim 3, wherein the at least one plunger element consists of the at least one movable part and a plate,
wherein the at least one movable part and the plate are integral with each other,
wherein the at least one movable part and the plate are inclined at a predetermined angle to each other,
wherein the elastic means consists of a torsion spring pivot that rotatably supports the at least one plunger element,
wherein the torsion spring pivot allows the at least one movable part to rotate in a cavity of the rim,
wherein the torsion spring pivot allows the plate to rotate in the chamber,
wherein the torsion spring pivot holds the at least one movable part in a predetermined position with respect to the rim, and
wherein the torsion spring pivot holds the at least one movable part in contact with the predetermined portion.

6. The device of claim 3, wherein the at least one plunger element consists of the at least one movable part and a piston,
wherein the at least one movable part and the piston are integral with each other,
wherein a longitudinal axis of the at least one movable part lies in an essentially-radial direction with respect to the rim,
wherein a longitudinal axis of the piston lies in an essentially-radial direction with respect to the rim,
wherein the piston is movable in the chamber,
wherein the elastic means comprises at least one spring supporting the at least one movable part in a cavity of the rim,
wherein the at least one spring holds the at least one movable part in a predetermined position with respect to the rim, and
wherein the at least one spring holds the at least one movable part in contact with the predetermined portion.

7. The device of claim 6, wherein the at least one movable part and the piston are joined together by a rod provided with an adjustable stroke-limiting means.

8. The device of claim 3, wherein the at least one movable part is a disc housed in a base of the rim.

9. The device of claim 3, wherein the second valve means can put the chamber into communication with an interior of the tyre.

10. The device of claim 3, further comprising a compressed-air reservoir communicating with the chamber through the second valve means.

11. The device of claim 10, wherein the compressed-air reservoir communicates with an interior of the tyre through further valve means that can make at least some of the compressed air flow into the interior of the tyre.

12. The device of claim 3, wherein the device is operationally connected to a regulating unit,
wherein the regulating unit comprises:
a pressure sensor; and
a control unit;
wherein the pressure sensor measures pressure within the tyre, and
wherein the control unit can cause opening and closing of further valve means to regulate inflation pressure of the tyre according to a predetermined mapping.

13. A rim for a tyre, comprising:
a device for generating energy during rolling of a tyre fitted on the rim, comprising:

at least one plunger element; and a chamber in which the at least one plunger element can move with reciprocating motion;

wherein the at least one plunger element comprises at least one part that can move with respect to the rim, wherein the at least one movable part is engaged with elastic means that hold the at least one movable part in a predetermined position with respect to the rim, so that the at least one movable part comes into contact with a predetermined portion of a bead of the tyre, wherein the predetermined portion exerts on the at least one movable part contact pressure that varies cyclically during each revolution of the tyre, wherein the chamber comprises first and second valve means, wherein the cyclic variation of the contact pressure causes the at least one movable part to move against action of the elastic means, compressing air present in the chamber using alternate outward and return strokes of the at least one plunger element, wherein at least some of the compressed air flows through the second valve means, wherein at least some air is drawn from an external environment into the chamber through the first valve means, and wherein the generated energy can be used to carry out operations with pressurized air during the rolling of the tyre.

14. A wheel for a motor vehicle, comprising:

a tyre fitted on a rim; and a device mounted on the rim for generating energy, comprising:

at least one plunger element; and a chamber in which the at least one plunger element can move with reciprocating motion;

wherein the tyre comprises beads in contact with the rim, wherein the at least one plunger element comprises at least one part that can move with respect to the rim, wherein the at least one movable part is engaged with elastic means that keep the at least one movable part in contact with a predetermined portion of one of the tyre beads, wherein the predetermined portion exerts on the at least one movable part contact pressure that varies cyclically during each revolution of the tyre, wherein the chamber comprises first and second valve means, wherein the cyclic variation of the contact pressure causes the at least one movable part to move against action of the elastic means, compressing air present in the chamber using alternate outward and return strokes of the at least one plunger element, wherein at least some of the compressed air flows through the second valve means, wherein at least some air is drawn from an external environment into the chamber through the first valve means, and wherein the generated energy can be used to carry out operations with pressurized air during rolling of the tyre.

15. A device for generating energy in a rolling wheel, comprising:

at least one part that can move with respect to a rim of the wheel;

wherein the wheel comprises a tyre fitted on the rim, wherein the tyre comprises beads in contact with the rim, wherein the at least one movable part is engaged with at least one spring or a torsion spring pivot that keeps the at least one movable part in contact with a predetermined portion of one of the tyre beads, wherein the at least one movable part undergoes reciprocating outward and return motion, against action of the at least one spring or the torsion spring pivot, as a result of forces induced in the at least one movable part by contact pressure that varies cyclically during each revolution of the tyre, and wherein the contact pressure is exerted on the at least one movable part by the predetermined portion of one of the tyre beads.

16. A device for generating energy during rolling of a tyre fitted on a rim, comprising:

at least one plunger element; and a chamber in which the at least one plunger element can move with reciprocating motion;

wherein the tyre comprises beads in contact with the rim, wherein the at least one plunger element comprises at least one part that can move with respect to the rim, wherein the at least one movable part is engaged with at least one spring or a torsion spring pivot that keeps the at least one movable part in contact with a predetermined portion of one of the tyre beads, wherein the predetermined portion exerts on the at least one movable part contact pressure that varies cyclically during each revolution of the tyre, wherein the chamber comprises first and second valves, wherein the cyclic variation of the contact pressure causes the at least one movable part to move against action of the at least one spring or the torsion spring pivot, compressing air present in the chamber using alternate outward and return strokes of the at least one plunger element, wherein at least some of the compressed air flows through the second valve, wherein at least some air is drawn from an external environment into the chamber through the first valve, and wherein the generated energy can be used to carry out operations with pressurized air during the rolling of the tyre.

17. A rim for a tyre, comprising:

a device for generating energy during rolling of a tyre fitted on the rim, comprising:

at least one plunger element; and a chamber in which the at least one plunger element can move with reciprocating motion;

wherein the at least one plunger element comprises at least one part that can move with respect to the rim, wherein the at least one movable part is engaged with at least one spring or a torsion spring pivot that holds the at least one movable part in a predetermined position with respect to the rim, so that the at least one movable part comes into contact with a predetermined portion of a bead of the tyre, wherein the predetermined portion exerts on the at least one movable part contact pressure that varies cyclically during each revolution of the tyre, wherein the chamber comprises first and second valves, wherein the cyclic variation of the contact pressure causes the at least one movable part to move against action of the at least one spring or the torsion spring pivot, compressing air present in the chamber using alternate outward and return strokes of the at least one plunger element, wherein at least some of the compressed air flows through the second valve, wherein at least some air is drawn from an external environment into the chamber through the first valve, and wherein the generated energy can be used to carry out operations with pressurized air during the rolling of the tyre.

18. A wheel for a motor vehicle, comprising:

a tyre fitted on a rim; and a device mounted on the rim for generating energy, comprising:
- at least one plunger element; and
- a chamber in which the at least one plunger element can move with reciprocating motion;

wherein the tyre comprises beads in contact with the rim, wherein the at least one plunger element comprises at least one part that can move with respect to the rim, wherein the at least one movable part is engaged with at least one spring or a torsion spring pivot that keeps the at least one movable part in contact with a predetermined portion of one of the tyre beads, wherein the predetermined portion exerts on the at least one movable part contact pressure that varies cyclically during each revolution of the tyre, wherein the chamber comprises first and second valves, wherein the cyclic variation of the contact pressure causes the at least one movable part to move against action of the at least one spring or the torsion spring pivot, compressing air present in the chamber using alternate outward and return strokes of the at least one plunger element, wherein at least some of the compressed air flows through the second valve, wherein at least some air is drawn from an external environment into the chamber through the first valve, and wherein the generated energy can be used to carry out operations with pressurized air during rolling of the tyre.

* * * * *